(12) United States Patent
Wang

(10) Patent No.: US 6,743,385 B2
(45) Date of Patent: Jun. 1, 2004

(54) WEAR-RESISTANT THREE-DIMENSIONAL FOAMABLE STRUCTURE AND THE METHOD FOR MANUFACTURING IT

(76) Inventor: Swei Mu Wang, No.3, Lane 229, Daya Rd., Daya Shiang, Taiching (TW)

( * ) Notice: Subject to any disclaimer, the term of this patent is extended or adjusted under 35 U.S.C. 154(b) by 0 days.

(21) Appl. No.: 10/151,902

(22) Filed: May 22, 2002

(65) Prior Publication Data

US 2003/0219554 A1 Nov. 27, 2003

(51) Int. Cl.[7] .............................................. B29C 44/06
(52) U.S. Cl. ................... 264/46.4; 264/45.1; 264/46.6; 264/102; 264/161
(58) Field of Search ............................. 264/46.6, 45.1, 264/46.4, 102, 161

(56) References Cited

U.S. PATENT DOCUMENTS

| | | | | |
|---|---|---|---|---|
| 4,134,942 A | * | 1/1979 | Mirr et al. ................... | 264/418 |
| 4,581,187 A | * | 4/1986 | Sullivan et al. ............ | 264/46.4 |
| 5,141,578 A | * | 8/1992 | Yang ........................... | 156/79 |
| 5,147,589 A | * | 9/1992 | Chang et al. ............... | 264/45.1 |
| 5,308,420 A | * | 5/1994 | Yang ........................... | 156/79 |
| 5,318,645 A | * | 6/1994 | Yang ........................... | 156/79 |
| 5,814,254 A | * | 9/1998 | Bisconti ....................... | 264/46.4 |
| 5,972,257 A | * | 10/1999 | Liu .............................. | 264/40.4 |
| 6,045,733 A | * | 4/2000 | Chu et al. ................... | 264/46.6 |
| 6,238,602 B1 | * | 5/2001 | Liu .............................. | 264/40.1 |

* cited by examiner

*Primary Examiner*—Allan R. Kuhns
(74) *Attorney, Agent, or Firm*—Rosenberg, Klein & Lee

(57) ABSTRACT

A method for manufacturing a wear-resistant three-dimensional foamable structure includes the steps of: a) preparing a retractable heat deformable wear-resistant substrate; b) working the substrate by a forming mold to form a housing having a three-dimensional shape, the housing having an inside formed with a receiving space; c) placing or directly forming a foamable body in the receiving space of the housing, so that the foamable body is combined with the substrate integrally, so that the wear-resistant substrate is mounted on an outer layer of the foamable body, thereby protecting the foamable body and enhancing an outer appearance of the foamable body; and d) cutting and trimming an edge of the substrate or the foamable body, thereby forming a foamable product.

8 Claims, 9 Drawing Sheets

WEAR-RESISTANT THREE-DIMENSIONAL FOAMABLE STRUCTURE AND THE METHOD FOR MANUFACTURING IT

BACKGROUND OF THE INVENTION

1. Field of the Invention

The present invention relates to a wear-resistant three-dimensional foamable structure and the method for manufacturing it, wherein the working time may be saved largely, and the efficiency may be enhanced.

2. Description of the Related Art

A conventional foamable product is available for an article, such as a shoe sole, a chair seat, a purse, a sport protective equipment or the like. The foamable product is formed by a foamable body which is initially foamed in a mold. Then, a surface layer structure is cut. Then, the surface layer structure is juxtaposed to the foamable body. Finally, a sewing or bonding procedure is performed, thereby forming the foamable product. However, the manufacturing process of the foamable product is complicated and needs much manual work, thereby consuming time and decreasing the efficiency of fabrication.

SUMMARY OF THE INVENTION

The primary objective of the present invention is to provide a wear-resistant three-dimensional foamable structure and the method for manufacturing it.

Another objective of the present invention is to provide a wear-resistant three-dimensional foamable structure and the method for manufacturing it, wherein the working time may be saved largely, and the efficiency may be enhanced.

A further objective of the present invention is to provide a wear-resistant three-dimensional foamable structure having an excellent wear-resistant feature.

A further objective of the present invention is to provide a wear-resistant three-dimensional foamable structure having an outstanding outer appearance.

In accordance with the present invention, there is provided a method for manufacturing a wear-resistant three-dimensional foamable structure, comprising the steps of:

a) preparing a retractable heat deformable wear-resistant substrate;

b) working the substrate by a forming mold to form a housing having a three-dimensional shape, the housing having an inside formed with a receiving space;

c) placing or directly forming a foamable body in the receiving space of the housing, so that the foamable body is combined with the substrate integrally, so that the wear-resistant substrate is mounted on an outer layer of the foamable body, thereby protecting the foamable body and enhancing an outer appearance of the foamable body; and d) cutting and trimming an edge of the substrate or the foamable body, thereby forming a foamable product.

The wear-resistant three-dimensional foamable structure includes an elastic wear-resistance substrate, and a foamable body. The wear-resistant substrate forms a housing having a three-dimensional shape. The housing has an inside formed with a receiving space. The foamable body is received in the receiving space of the substrate, so that the wear-resistant substrate is mounted on an outer layer of the foamable body, thereby protecting the foamable body and enhancing an outer appearance of the foamable body.

The wear-resistant substrate includes a pattern layer having colors and figures, and a light permeable wear-resistant outer layer film, the outer layer film is combined on an outer face of the pattern layer, thereby forming the two-layer wear-resistant substrate.

Further benefits and advantages of the present invention will become apparent after a careful reading of the detailed description with appropriate reference to the accompanying drawings.

DETAILED DESCRIPTION OF THE INVENTION

Figure 1:
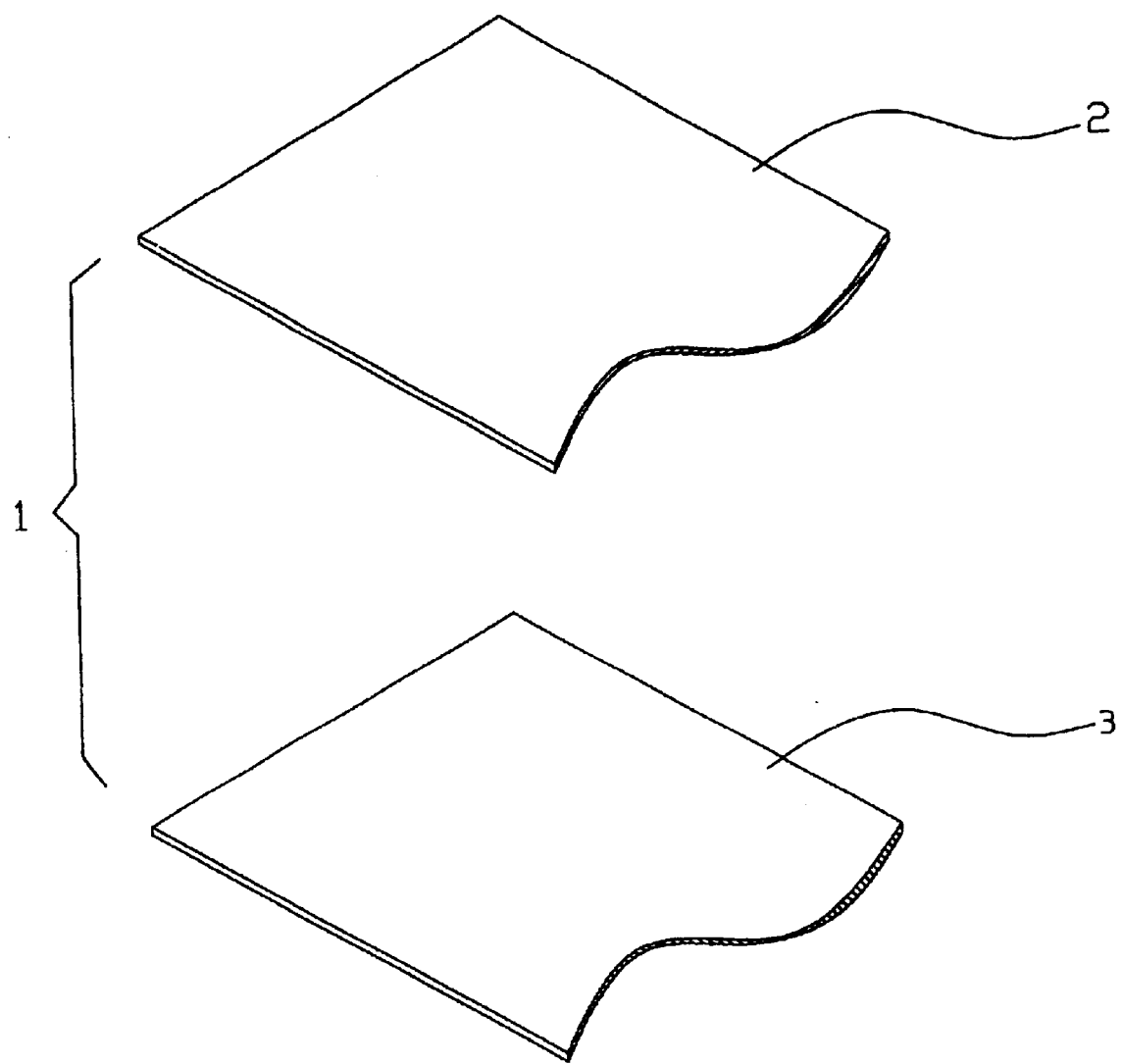
FIG. 1 is an exploded perspective view of a substrate in accordance with a preferred embodiment of the present invention.
Figure 2:
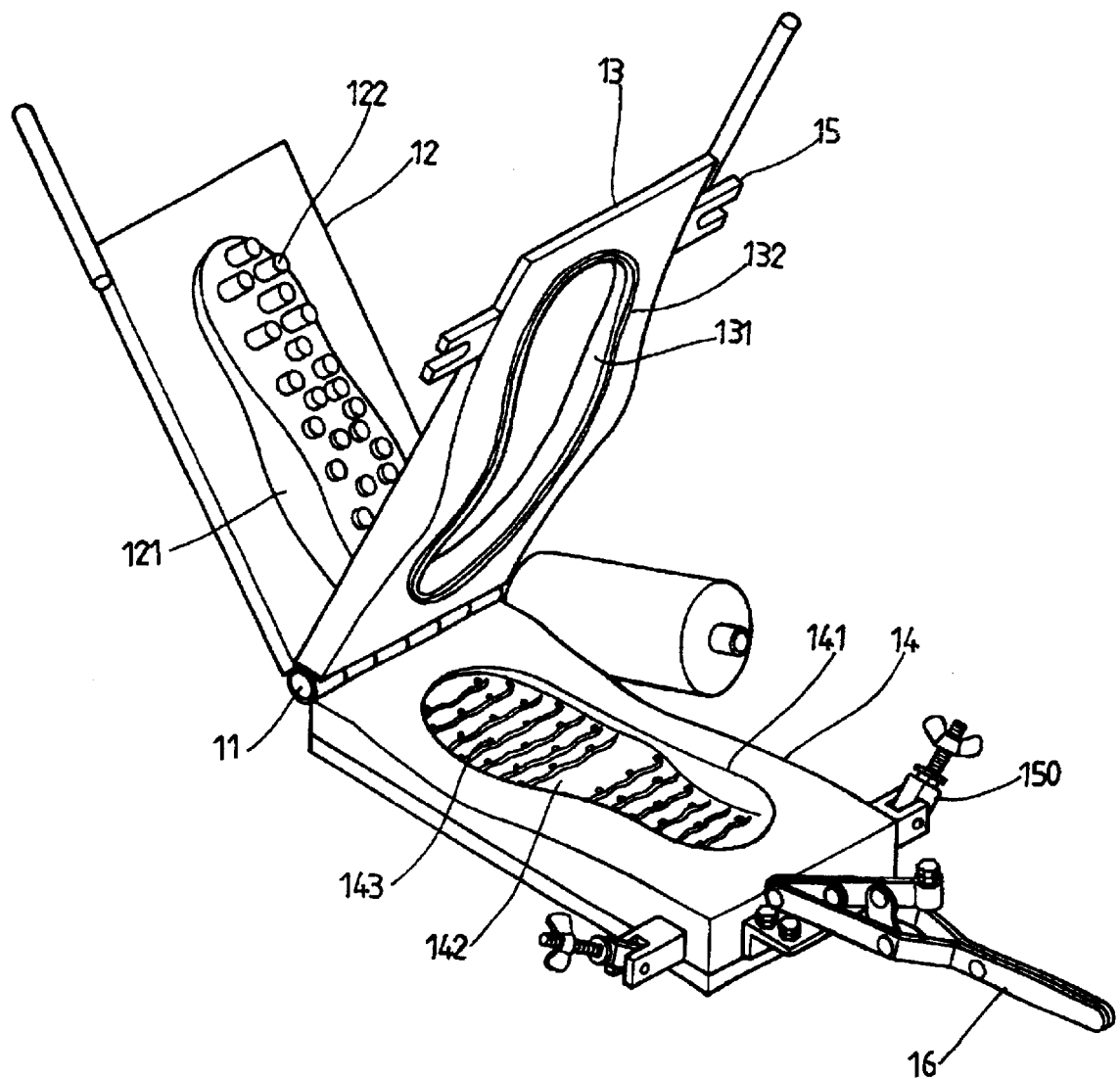
FIG. 2 is a perspective view of a vacuum forming mold in accordance with a preferred embodiment of the present invention.
Figure 3:
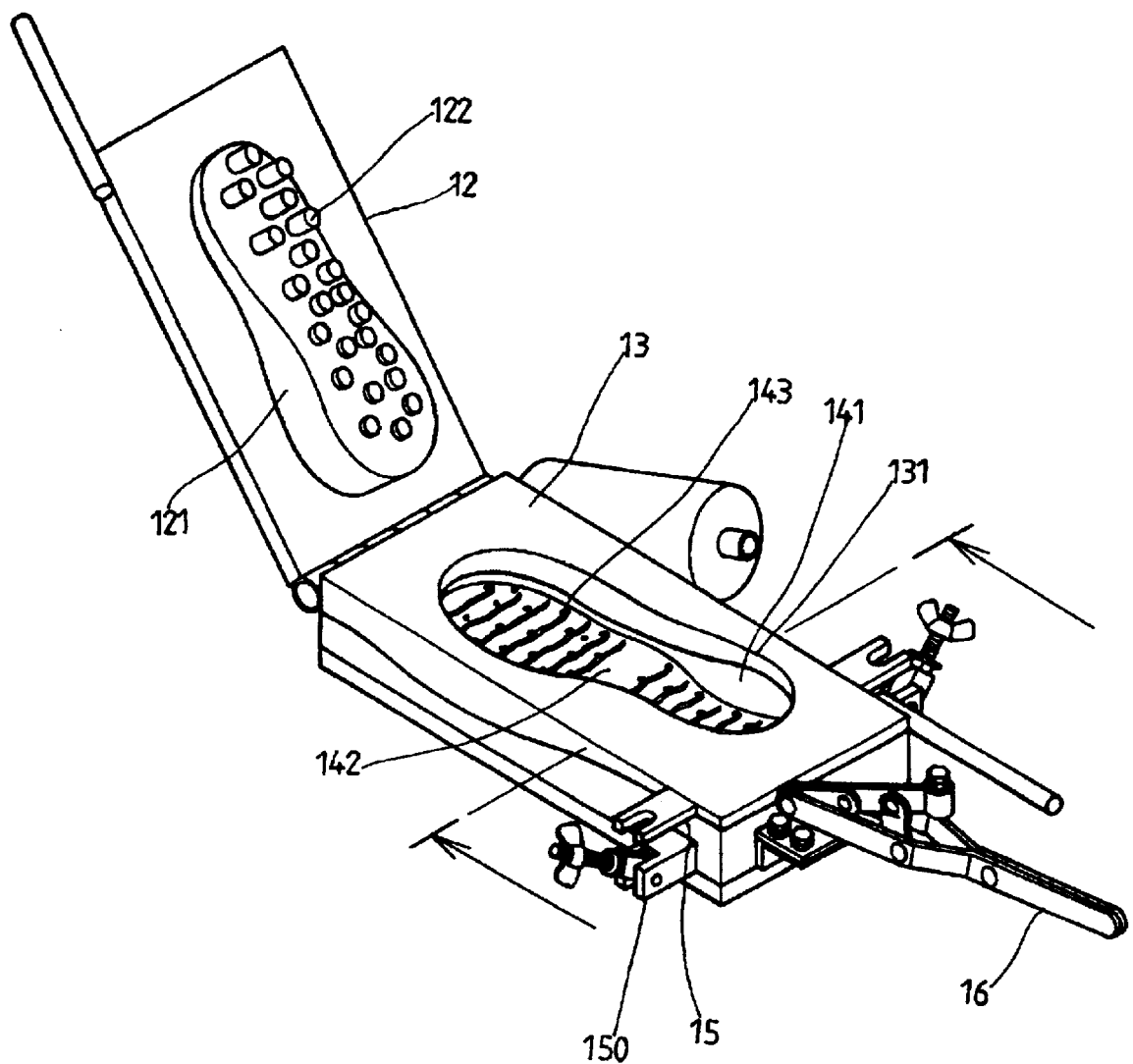
FIG. 3 is a schematic operational view of the vacuum forming mold as shown in FIG. 2 in use.
Figure 4:
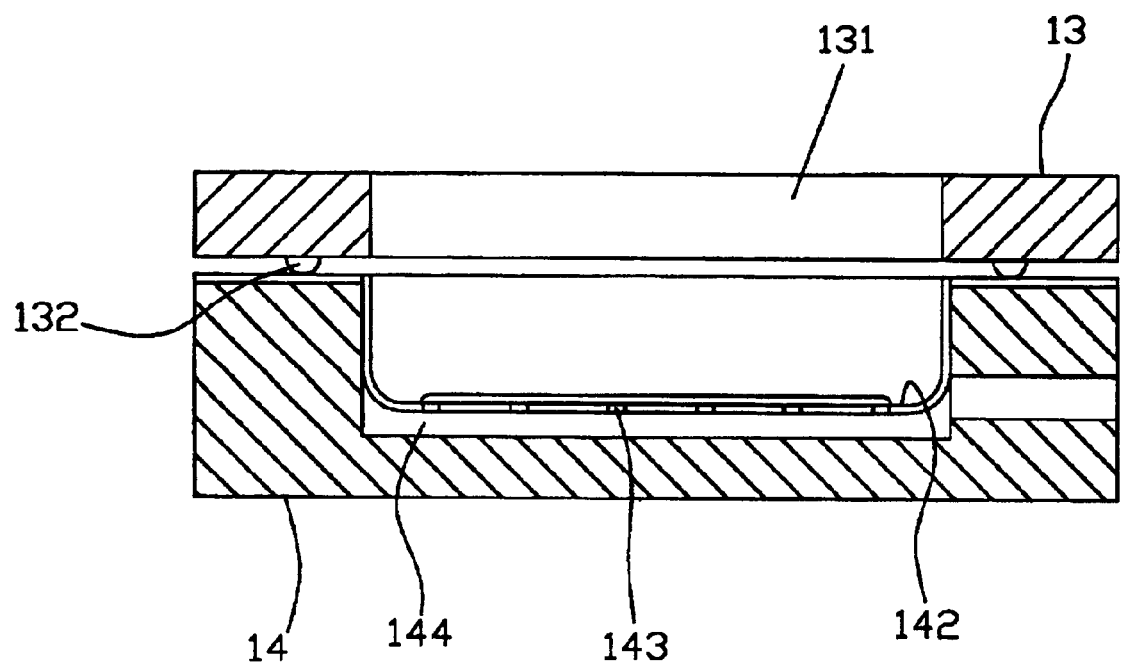
FIG. 4 is a side plan cross-sectional view of the vacuum forming mold as shown in FIG. 3.

Referring to the drawings and initially to FIG. 1, a method for manufacturing a wear-resistant three-dimensional foamable structure in accordance with a preferred embodiment of the present invention comprises the following steps.

First of all, a retractable heat deformable substrate 1 is provided. The substrate 1 includes a pattern layer 2 having colors and figures, and a light permeable wear-resistant outer layer film 3. The outer layer film 3 is combined on a bottom face of the pattern layer 2, thereby forming the integral wear-resistant substrate 1.

Figure 6:
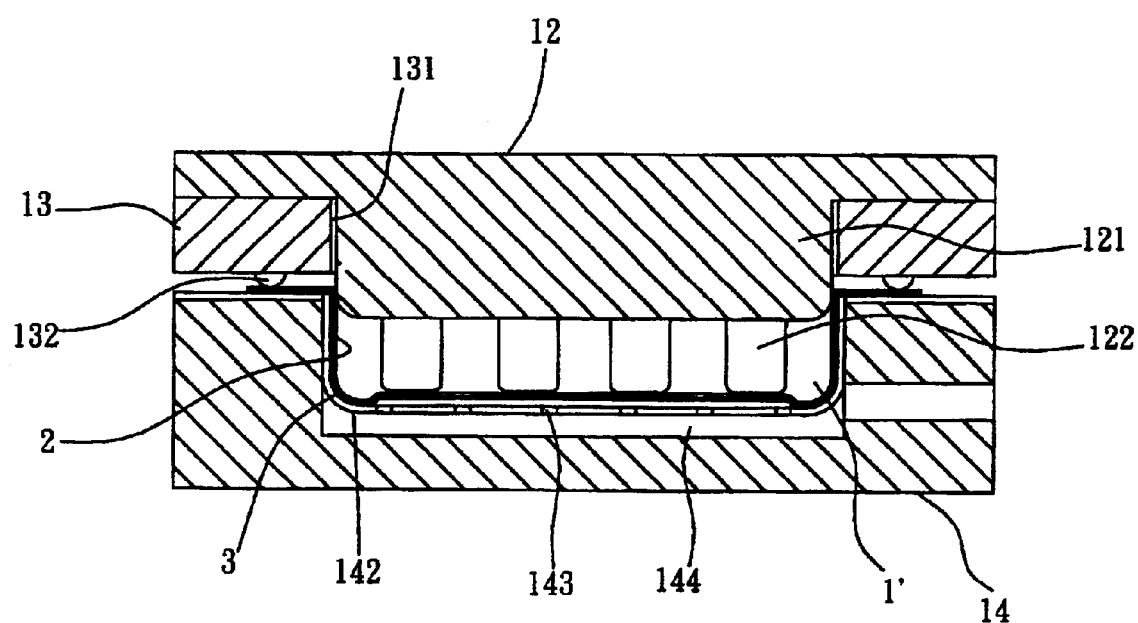
FIG. 6 is a side plan cross-sectional view of the vacuum forming mold as shown in FIG. 5.

Then, the substrate 1 may be worked by a vacuum forming mold, an injection molding die or the like, to form a housing having a three-dimensional shape. The housing has an inside formed with a receiving space 1' as shown in FIG. 6.

Figure 7:
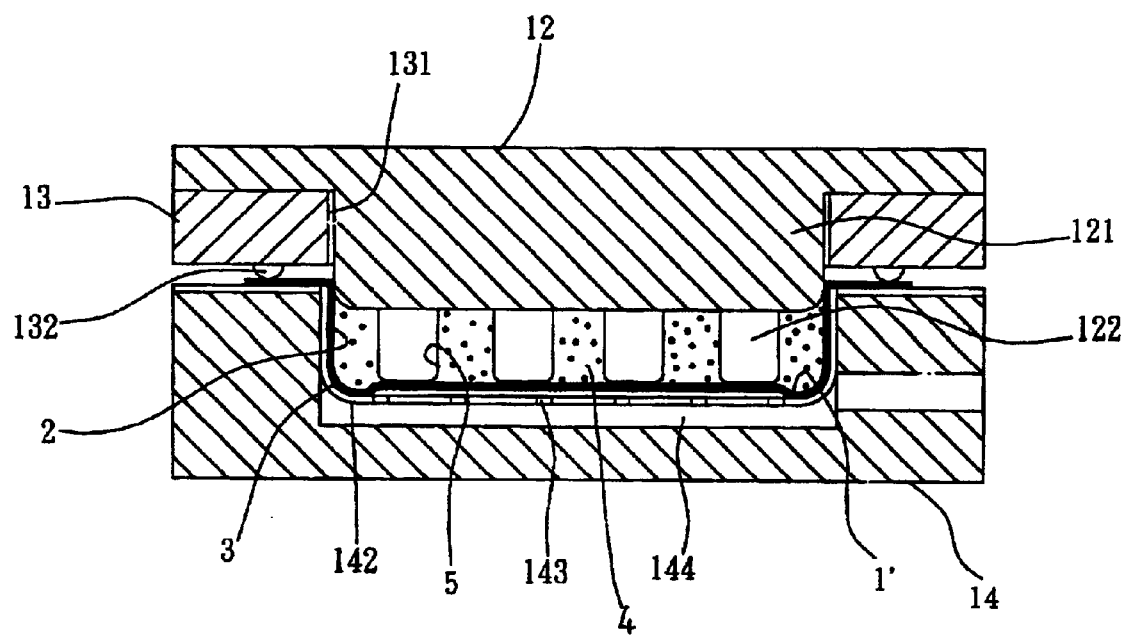
FIG. 7 is a side plan cross-sectional view of the vacuum forming mold as shown in FIG. 5.

Then, as shown in FIG. 7, a foamable body 4 is placed in the receiving space 1' of the housing, so that the foamable body 4 is combined with the substrate 1 integrally. Thus, the wear-resistant substrate 1 is mounted on the outer layer of the foamable body 4, thereby protecting the foamable body 4 and enhancing the outer appearance of the foamable body 4.

Finally, the edge of the substrate 1 or the foamable body 4 is cut and trimmed, thereby forming a foamable product.

Referring to FIGS. 2–5, the vacuum forming mold in accordance with a preferred embodiment of the present invention comprises a pivot device 11 for pivoting a male die 12, a clamping die 13, and a female die 14, so that the male die 12 and the clamping die 13 may be mounted on the female die 14.

The female die 14 is provided with a die cavity 141 that may match the shape of an article, such as a shoe sole, a chair seat, a purse, a sport protective equipment or the like. The die cavity 141 of the female die 14 has a bottom provided with a die plate 142 which is formed with multiple holes 143. The female die 14 is provided with a cavity chamber 144 located under the die plate 142 and communicated with the multiple holes 143. The cavity chamber 144 is connected to an evacuation device (not shown).

Figure 5:
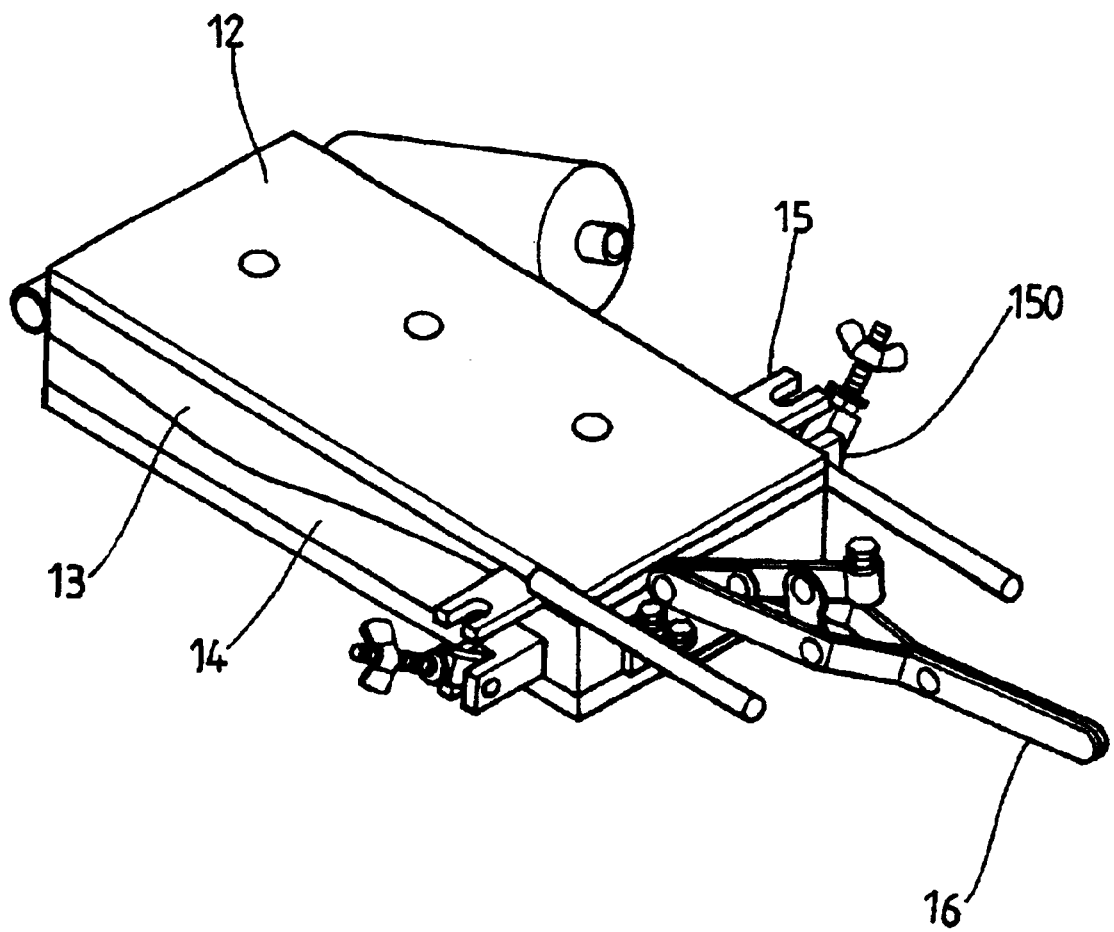
FIG. 5 is a schematic operational view of the vacuum forming mold as shown in FIG. 3 in use.

The clamping die 13 is formed with a slot 131 aligning with the die cavity 141 of the female die 14, and is provided with a protruding rubber ring 132 surrounding the periphery of the slot 131. The female die 14 is provided with a locking device 150, and the clamping die 13 is provided with a snapping device 15 that may be locked on the locking device 150 of the female die 14, so that the rubber ring 132 is tightly sealed between the clamping die 13 and the female die 14 as shown in FIG. 5.

The male die 12 is provided with a die block 121 aligning with the slot 131 of the clamping die 13. Thus, when the male die 12 is mounted on the clamping die 13, the die block 121 of the male die 12 is inserted into the slot 131 of the clamping die 13. In addition, the die block 121 of the male die 12 has a bottom provided with multiple press posts 122 that may be inserted into the die cavity 141 of the female die 14.

Referring to FIG. 6, the integral wear-resistant substrate 1 formed by the pattern layer 2 and the outer layer film 3 may be heated to a deformable temperature, and may then be placed between the clamping die 13 and the female die 14, with the outer layer film 3 being located adjacent to the die cavity 141 of the female die 14. Then, the snapping device 15 of the clamping die 13 may be locked on the locking device 150 of the female die 14, so that the substrate 1 is tightly pressed by the rubber ring 132 between the clamping die 13 and the female die 14, and the die cavity 141 of the female die 14 may form a sealed space. Then, the multiple press posts 122 of the die block 121 of the male die 12 may be inserted into the die cavity 141 of the female die 14, and the evacuation device may be started to evacuate the die cavity 141 of the female die 14, so that the substrate 1 may mate with the shape of the die plate 142 to form a three-dimensional housing having the shape such as the shoe sole or the like. At this time, the pattern layer 2 forms the inner layer of the substrate 1, and the outer layer film 3 forms the outer layer of the substrate 1. Thus, the substrate 1 may be worked by the vacuum forming mold to form a housing having a three-dimensional shape, wherein the housing has an inside formed with a receiving space 1' as shown in FIG. 6.

Referring to FIGS. 6 and 7, the male die 12 may be opened, so that the foamable body 4 may be filled into the receiving space 1' of the housing and rested on the pattern layer 2 of the substrate 1. Then, the male die 12 may be mounted on the female die 14, and a press device 16 of the female die 14 may exert a pressure on the male die 12 successively, so that the substrate 1 and the foamable body 4 may be combined to form a structure having the shape such as the shoe sole or the like. The multiple press posts 122 of the die block 121 of the male die 12 may be inserted into the foamable body 4, thereby forming multiple mounting holes 5 in the foamable body 4, so that the shoe sole may be mounted on the shoe boot rapidly by the multiple mounting holes 5.

On the other hand, the male die 12 may be coated with a layer of heat melted gel previously, so that the heat melted gel may be coated in the receiving space 1' of the substrate 1 after the male die 12 is mounted on the female die 14. Then, the foamable body 4 may be formed previously, and then mounted in the receiving space 1' of the substrate 1, so that the substrate 1 may form the outer layer of the foamable body 4.

Figure 9:
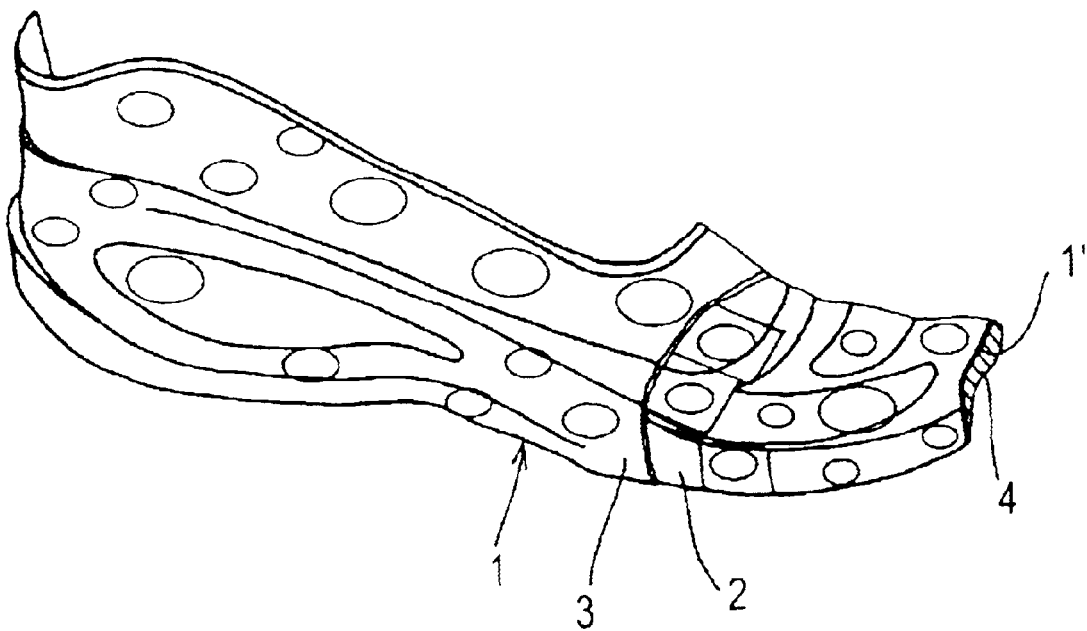
FIG. 9 is a partially cut-away perspective view of a foamable structure in accordance with the preferred embodiment of the present invention.

Finally, the edge of the substrate 1 or the foamable body 4 may be cut and trimmed, thereby forming a foamable product as shown in FIG. 9, wherein the substrate 1 includes a pattern layer 2 having colors and figures, and a light permeable wear-resistant outer layer film 3. The outer layer film 3 is combined with the pattern layer 2, thereby forming the integral wear-resistant substrate 1 which may provide a three-dimensional viewing effect, thereby enhancing the aesthetic quality of the foamable structure. In addition, the pattern layer 2 may be replaced, so that the foamable structure may have pattern layers 2 of different viewing effects, thereby saving the cost of fabrication. Further, the foamable structure may have a variable outer appearance and have a wear-resistant quality.

Figure 8:
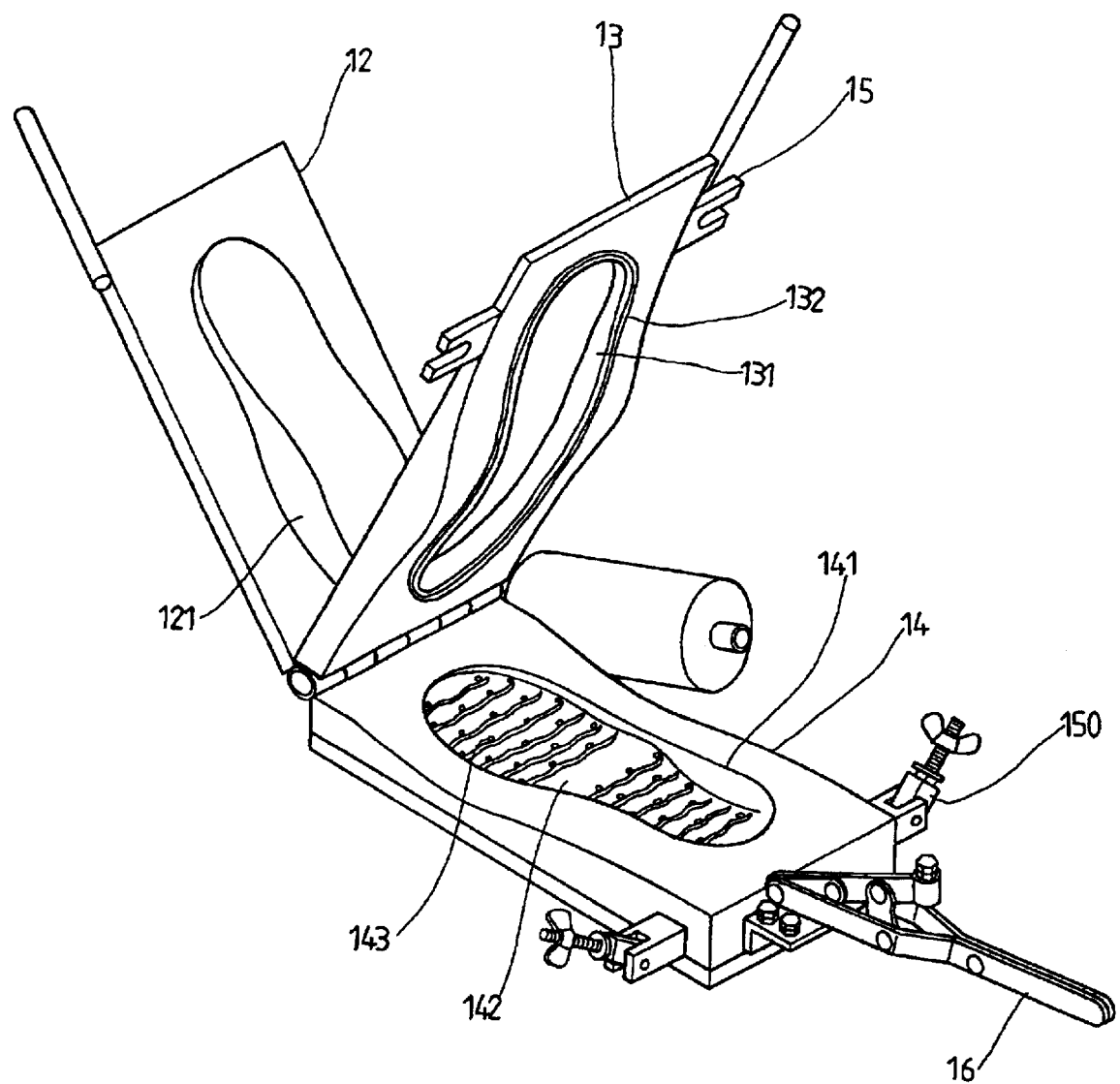
FIG. 8 is a perspective view of a vacuum forming mold in accordance with another embodiment of the present invention.

As shown in FIG. 8, in accordance with another preferred embodiment of the present invention, the multiple press posts 122 of the die block 121 of the male die 12 are undefined.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A method for manufacturing a wear-resistant three-dimensional foamable structure, comprising the steps of:
    a) preparing a retractable heat deformable wear-resistant substrate, the substrate including a pattern layer and an outer layer film combined integrally one with the other;
    b) working the substrate by a forming mold to form a housing having a three-dimensional shape, the housing having an inside formed with a receiving space;
    c) placing or directly forming a foamable body in the receiving space of the housing, so that the foamable body is combined with the substrate integrally, so that the wear-resistant substrate is mounted on an outer layer of the foamable body, thereby protecting the foamable body and enhancing an outer appearance of the foamable body; and
    d) cutting and trimming an edge of the substrate or the foamable body, thereby forming a foamable product.

2. The method for manufacturing a wear-resistant three-dimensional foamable structure in accordance with claim 1, wherein the forming mold comprises a pivot device for pivoting a male die, a clamping die, and a female die, the male die and the clamping die being mountable on the female die.

3. The method for manufacturing a wear-resistant three-dimensional foamable structure in accordance with claim 2, wherein the male die is coated with a layer of heat melted gel previously, so that the heat melted gel is coated in the receiving space of the substrate after the male die is mounted on the female die, the foamable body being formed previously, then mounted in the receiving space of the substrate, so that the substrate forms the outer layer of the foamable body.

4. A method for manufacturing a wear-resistant three-dimensional foamable structure comprising the steps of:

a) preparing a retractable heat deformable wear-resistant substrate;
b) working the substrate by a forming mold to form a housing having a three-dimensional shape, the housing having an inside formed with a receiving space;
c) placing or directly forming a foamable body in the receiving space of the housing, so that the foamable body is combined with the substrate integrally, so that the wear-resistant substrate is mounted on an outer layer of the foamable body, thereby protecting the foamable body and enhancing an outer appearance of the foamable body; and
d) cutting and trimming an edge of the substrate or the foamable body, thereby forming a foamable product;
wherein the forming mold comprises a pivot device for pivoting a male die, a clamping die, and a female die, the male die and the clamping die being mountable on the female die;
wherein the female die is provided with a die cavity, the die cavity of the female die has a bottom provided with a die plate which is formed with multiple holes, the female die is provided with a cavity chamber located under the die plate and communicated with the multiple holes, the cavity chamber is connected to an evacuation device, the clamping die is formed with a slot aligning with the die cavity of the female die, and is provided with a protruding rubber ring surrounding a periphery of the slot, and the male die is provided with a die block aligning with the slot of the clamping die, so that when the male die is mounted on the clamping die, the die block of the male die is inserted into the slot of the clamping die.

5. The method for manufacturing a wear-resistant three-dimensional foamable structure in accordance with claim 4, wherein the female die is provided with a locking device, and the clamping die is provided with a snapping device for locked engagement of the locking device of the female die, so that the rubber ring is tightly sealed between the clamping die and the female die.

6. The method for manufacturing a wear-resistant three-dimensional foamable structure in accordance with claim 4, wherein the die block of the male die has a bottom provided with multiple press posts for insert into the die cavity of the female die.

7. The method for manufacturing a wear-resistant three-dimensional foamable structure in accordance with claim 4, wherein the substrate is heated to a deformable temperature, and is placed between the clamping die and the female die, with an outer layer film of the substrate being located adjacent to the die cavity of the female die, a snapping device of the clamping die is locked on a locking device of the female die, so that the substrate is tightly pressed by the rubber ring between the clamping die and the female die, and the die cavity of the female die thereby forms a sealed space, multiple press posts of the die block of the male die being disposed for insert into the die cavity of the female die, and the die cavity of the female die being thereafter evacuated, so that the substrate mates with the shape of the die plate to form a three-dimensional housing, and the foamable body fills the receiving space of the housing upon the pattern layer of the substrate, so that the substrate and the foamable body combine to form a structure having a pattern layer, an outer layer film, and a foamable body.

8. A method for manufacturing a wear-resistant three-dimensional foamable structure comprising the steps of:
a) preparing a retractable heat deformable wear-resistant substrate;
b) working the substrate by a forming mold to form a housing having a three-dimensional shape, the housing having an inside formed with a receiving space;
c) placing or directly forming a foamable body in the receiving space of the housing, so that the foamable body is combined with the substrate integrally, so that the wear-resistant substrate is mounted on an outer layer of the foamable body, thereby protecting the foamable body and enhancing an outer appearance of the foamable body; and
d) cutting and trimming an edge of the substrate or the foamable body, thereby forming a foamable product;
wherein the wear-resistant substrate includes a pattern layer having colors and figures, and a light permeable wear-resistant outer layer film, the outer layer film being combined on a bottom face of the pattern layer, thereby forming the integral wear-resistant substrate.

* * * * *